United States Patent
Kahn et al.

(10) Patent No.: US 12,140,975 B2
(45) Date of Patent: Nov. 12, 2024

(54) DEVICES, SYSTEMS AND METHODS FOR NAVIGATING A MOBILE PLATFORM

(71) Applicant: ELBIT SYSTEMS C4I AND CYBER LTD., Netanya (IL)

(72) Inventors: Yair Kahn, Netanya (IL); Nir Burshtein, Netanya (IL); Ohad Volvovitch, Netanya (IL); Alon Faraj, Netanya (IL); Amit Nativ, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 18/406,729

(22) Filed: Jan. 8, 2024

(65) Prior Publication Data

US 2024/0152159 A1 May 9, 2024

Related U.S. Application Data

(63) Continuation of application No. PCT/IB2022/056413, filed on Jul. 12, 2022.

(30) Foreign Application Priority Data

Jul. 13, 2021 (IL) .......................................... 284872

(51) Int. Cl.
*G01S 19/43* (2010.01)
*G05D 1/246* (2024.01)
(Continued)

(52) U.S. Cl.
CPC .............. *G05D 1/644* (2024.01); *G05D 1/246* (2024.01); *G06T 7/70* (2017.01); *G06V 20/17* (2022.01);
(Continued)

(58) Field of Classification Search
CPC .............. B64C 39/024; B64U 2201/00; B64U 2201/10; B64U 10/13; B25J 13/089;
(Continued)

(56) References Cited

U.S. PATENT DOCUMENTS 9,211,947 B2 12/2015 Miralles
9,709,990 B2 * 7/2017 Deshpande .......... G05D 1/0248
(Continued)

FOREIGN PATENT DOCUMENTS

| CN | 212253846 U | * 12/2020 | |
| IL | 268486 A | 11/2019 | |
| JP | 2010193428 A | * 9/2010 | ............ B60W 40/11 |

OTHER PUBLICATIONS

Wu, Yibin, et al. "Artificial marker and MEMS IMU-based pose estimation method to meet multirotor UAV landing requirements." Sensors 19.24 (2019): 5428. (Year: 2019).*
(Continued)

*Primary Examiner* — Cuong H Nguyen
(74) *Attorney, Agent, or Firm* — The Roy Gross Law Firm, LLC; Roy Gross

(57) ABSTRACT

Aspects of embodiments to systems and methods for navigating a mobile platform using an imaging device on the platform, from a point of origin towards a target located in a scene, and without requiring a Global Navigation Satellite system (GNSS), by employing the following steps: acquiring, by the imaging device, an image of the scene comprising the target; determining, based on analysis of the image, a direction vector pointing from the mobile platform to the target; advancing the mobile platform in accordance with the direction vector to a new position; and generating, by a distance sensing device, an output as a result of attempting to determine, with the distance sensing device, a distance between the mobile platform and the target. The mobile platform advanced towards the target until the output pro-
(Continued)

duced by the distance sensing device is descriptive of a distance which meets a low-distance criterion.

20 Claims, 11 Drawing Sheets

(51) Int. Cl.
*G05D 1/644* (2024.01)
*G06T 7/70* (2017.01)
*G06V 20/10* (2022.01)
*G06V 20/17* (2022.01)
*G05D 101/15* (2024.01)
*G05D 109/20* (2024.01)
*G05D 111/10* (2024.01)

(52) U.S. Cl.
CPC ....... *G06V 20/176* (2022.01); *G05D 2101/15* (2024.01); *G05D 2109/20* (2024.01); *G05D 2111/10* (2024.01); *G06T 2207/10032* (2013.01); *G06T 2207/30184* (2013.01); *G06V 2201/07* (2022.01)

(58) Field of Classification Search
CPC .... G05G 5/0069; G08G 5/0069; G01S 19/45; G01S 13/06; G01S 5/0054; G01S 15/06; G01S 15/08
USPC .................................................. 701/25; 901/1
See application file for complete search history.

(56) References Cited

U.S. PATENT DOCUMENTS

| | | | | |
|---|---|---|---|---|
| 10,514,711 | B2* | 12/2019 | Bar-Nahum | G06V 20/17 |
| 11,635,775 | B2* | 4/2023 | Wang | G06V 20/13 701/3 |
| 11,762,398 | B1* | 9/2023 | Taylor | B64D 27/24 701/16 |
| 2008/0177472 | A1 | 7/2008 | Vos et al. | |
| 2009/0125223 | A1 | 5/2009 | Higgins | |
| 2009/0306840 | A1 | 12/2009 | Blenkhorn et al. | |
| 2014/0180526 | A1* | 6/2014 | Deshpande | G05D 1/0248 701/25 |
| 2016/0026189 | A1 | 1/2016 | Boada-Bauxell et al. | |
| 2016/0122038 | A1 | 5/2016 | Fleischman et al. | |
| 2017/0192430 | A1 | 7/2017 | Yang et al. | |
| 2017/0313332 | A1* | 11/2017 | Paget | B61L 27/40 |
| 2019/0025858 | A1* | 1/2019 | Bar-Nahum | G06T 7/73 |
| 2019/0041852 | A1 | 2/2019 | Schubert et al. | |
| 2019/0302276 | A1 | 10/2019 | Sandford et al. | |
| 2019/0325638 | A1* | 10/2019 | Lucas | G06T 15/005 |
| 2019/0368888 | A1 | 12/2019 | Geng et al. | |
| 2020/0018609 | A1 | 1/2020 | Nagy et al. | |
| 2022/0058966 | A1* | 2/2022 | Baranek | G06F 17/16 |
| 2022/0299543 | A1* | 9/2022 | Carlson | G01P 21/00 |

OTHER PUBLICATIONS

Mondal, Mainak, et al. "Non-GNSS navigation systems in aerial vehicles (multi-rotors)." 2021 International Conference on Information Technology (ICIT). IEEE, 2021. (Year: 2021).*
Mondal, Mainak, and Sergey Poslavskiy. an abstract of "Offline navigation (homing) of aerial vehicles (quadcopters) in GPS denied environments." Unmanned Systems 9.02 (2021): 119-127 (Year: 2021).*
Schops, Thomas, Torsten Sattler, and Marc Pollefeys. "Bad slam: Bundle adjusted direct rgb-d slam." Proceedings of the IEEE/CVF Conference on Computer Vision and Pattern Recognition. (Year: 2019).*
Ko, Ronny, et al. "Ultraverse: Efficient Retroactive Operation for Attack Recovery in Database Systems and Web Frameworks." arXiv preprint arXiv:2211.05327 (Year: 2022).*
Liou, Jaeik. Temporal support for land information systems in object-oriented modeling. Diss. Institutionen för fastigheter och byggande, (Year: 1999).*
Kumaraswamy, Raksha, et al. "Context-dependent upper-confidence bounds for directed exploration." Advances in Neural Information Processing Systems 31 (Year: 2018).*
IL 2nd Office Action dated Jun. 23, 2022 for P10896-IL for IL application 284872, 3 pages.
PCT International Preliminary Report on Patentability for International Application No. PCT/IB2022/056413, mailed on Jan. 25, 2024, 5 pages.
PCT International Search Report and Written Opinion from International Application No. PCT/IB2022/056413 mailed Sep. 29, 2022, 6 pages.
Israel Search Report and 1st office action for Application No. IL284872, dated Dec. 19, 2021, 13 pages.
PCT International Search Report for International Application No. PCT/IB2022/056413, mailed Sep. 29, 2022, 3pp.
PCT Written Opinion for International Application No. PCT/IB2022/056413, mailed Sep. 29, 2022, 3pp.
Extended European Search Report for European Application No. 22841581.6, mailed Aug. 6, 2024, 07 Pages.
F. Vanegas, D. Campbell, M. Eich and F. Gonzalez, "UAV based target finding and tracking in GPS-denied and cluttered environments," 2016 IEEE/RSJ International Conference on Intelligent Robots and Systems, Daejeon, Korea (South), 2016, pp. 2307-2313, doi: 10.1109/IROS.2016.7759360.
J. Zhang, Y. Wu, W. Liu and X. Chen, "Novel Approach to Position and Orientation Estimation in Vision-Based UAV Navigation," in IEEE Transactions on Aerospace and Electronic Systems, vol. 46, No. 2, pp. 687-700, Apr. 2010, doi: 10.1109/TAES.2010.5461649.

* cited by examiner

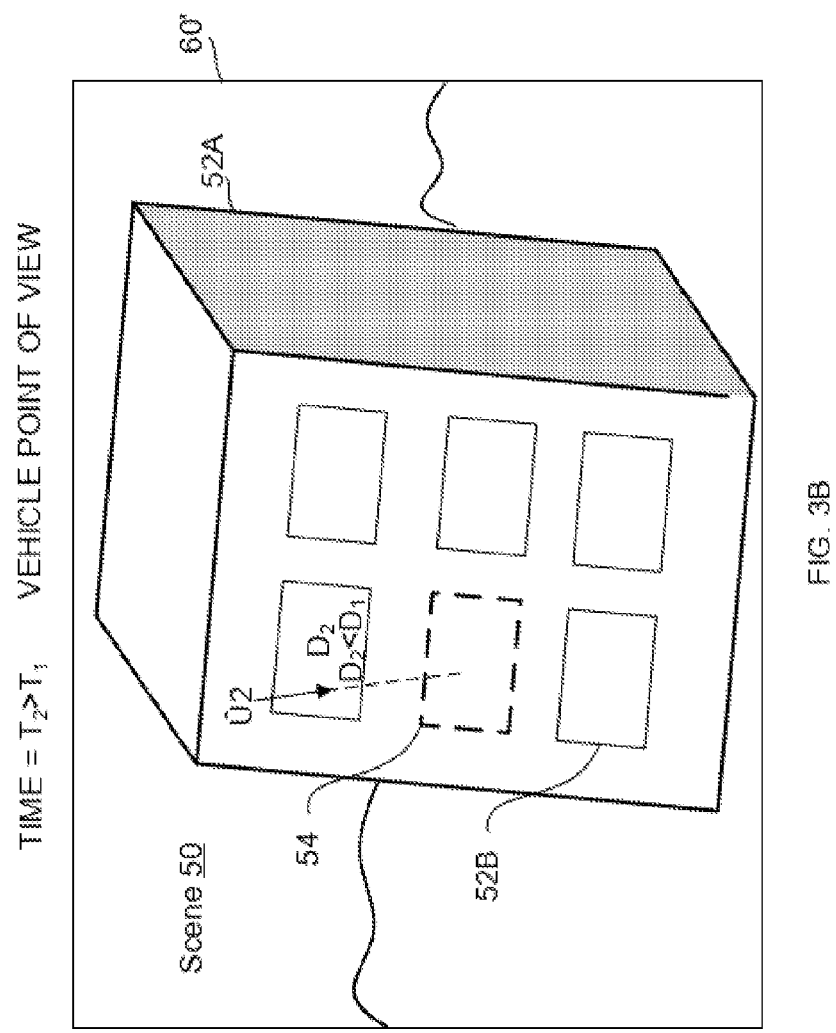

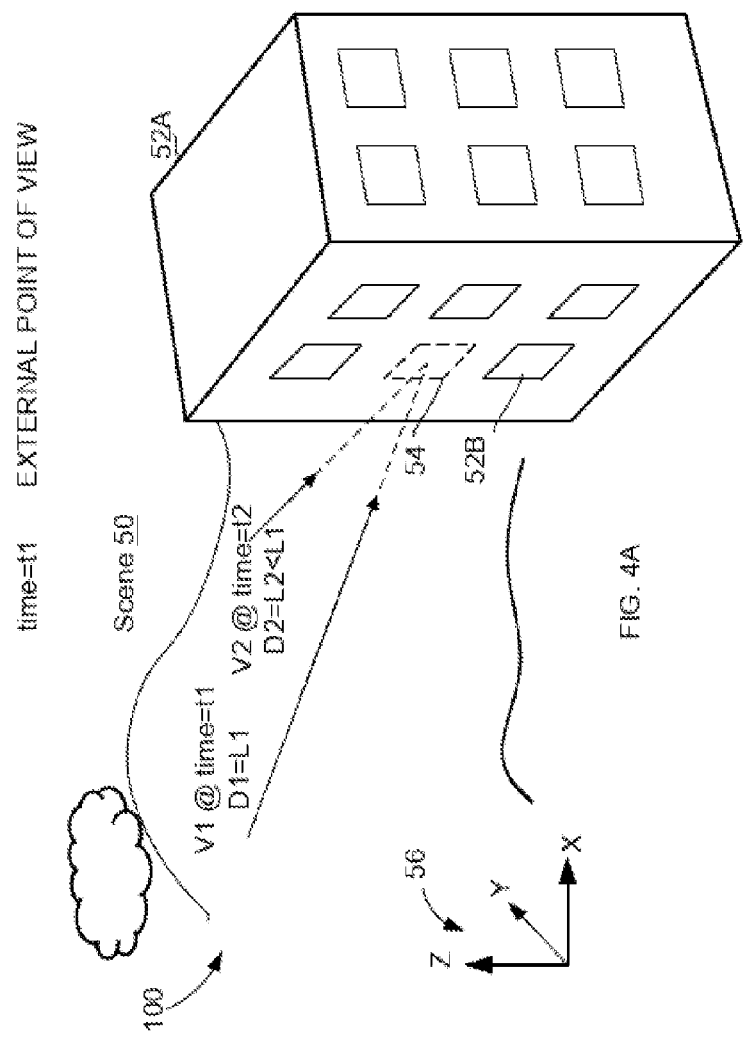

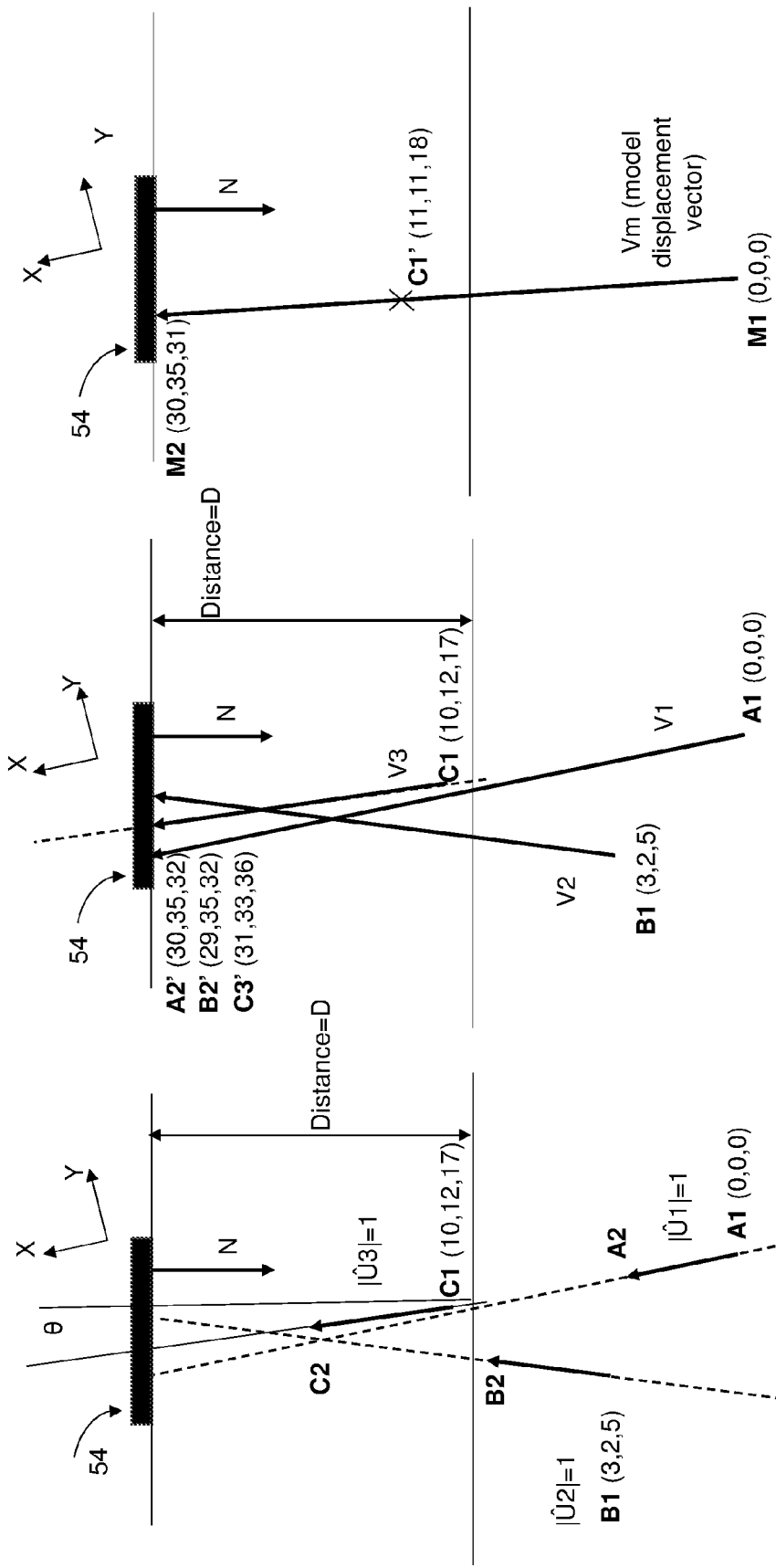

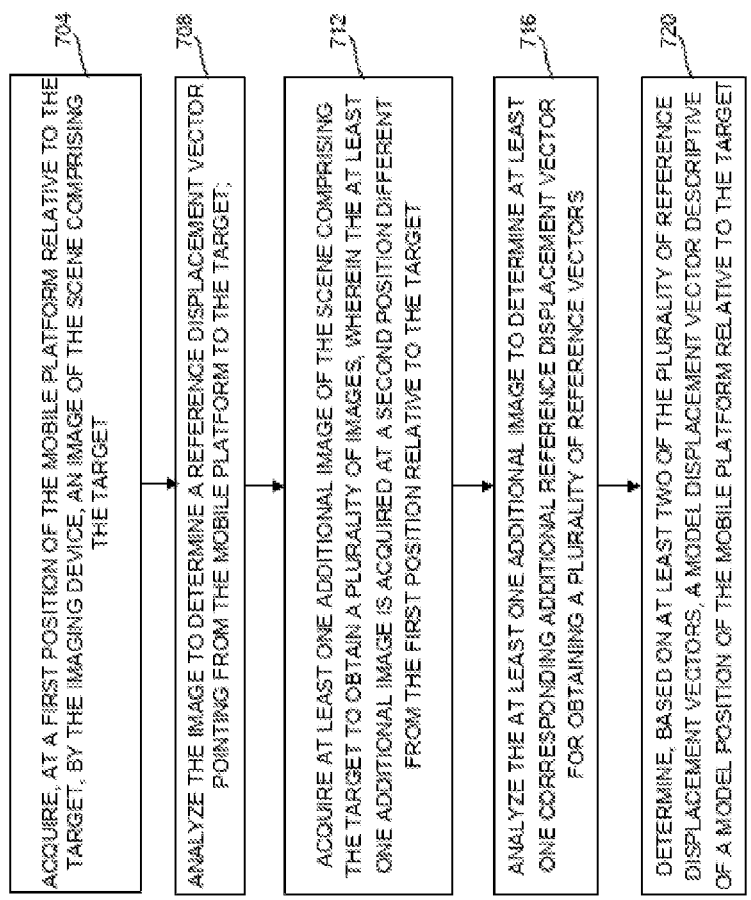

DEVICES, SYSTEMS AND METHODS FOR NAVIGATING A MOBILE PLATFORM

CROSS-REFERENCE TO RELATED APPLICATIONS/CLAIM OF PRIORITY

This application is a Bypass Continuation of PCT Patent Application No. PCT/IB2022/056413, having International filing date of 12 Jul. 2022, which claims domestic and international priority from Israel Patent Application 284872 filed 13 Jul. 2021, titled "DEVICES, SYSTEMS AND METHODS FOR NAVIGATING A MOBILE PLATFORM", the contents of which are all incorporated herein by reference in their entirety.

TECHNICAL FIELD

The present disclosure relates to mobile platform navigation.

BACKGROUND

Unmanned vehicles (UVs) are becoming increasingly prevalent and are used in a constantly increasing number of fields and applications.

UVs may operate with various degrees of autonomy, ranging between remote control by a human operator, remote computerized control, autonomously by onboard computers, or a combination thereof. While UVs originated mostly in military applications, their use is rapidly finding many more civil applications including aerial photography, agriculture, policing and surveillance, infrastructure inspection, science, and sports such as UV racing.

Some types of UV missions require the UV to arrive to a target (or target location) at remarkably high accuracy, including for example some military operations in which it is important not to harm people or property beyond the absolute necessity, product deliveries in which it is important to deliver the product to the exact location, or the like.

Navigating to the exact location may be performed using Global Navigation Satellite systems (GNSS) or Global Positioning Satellite System (GPSS), which provides geolocation and time information to a GPS receiver anywhere on or near Earth where there is an unobstructed line of sight to four or more satellites. One commonly used GPSS is the Global Positioning System (GPS) which is owned by the United States government and operated by the United States Space Force.

However, the usage of GPSS is not always possible or desirable, due for example to sightline to the area, dependence on a service that may be temporarily stopped, or the like. Such limitation may severely limit the usage of unmanned vehicles in certain areas or for certain applications.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 3B shows the scene pf FIG. 3A, from a point of view of the airborne mobile platform at the second point in time, in accordance with some exemplary embodiments of the disclosure.

FIGS. 4A and 4B shows length indications for a first displacement vector V1 and a second displacement vector V2 at corresponding time stamps, in accordance with some exemplary embodiments of the disclosure.

FIG. 6A-D schematically illustrate methods for navigating a mobile platform towards a target, according to some embodiments.

FIG. 7 shows a flowchart of a method for determining a model displacement vector, according to some embodiments.

DETAILED DESCRIPTION

Figure 1A:
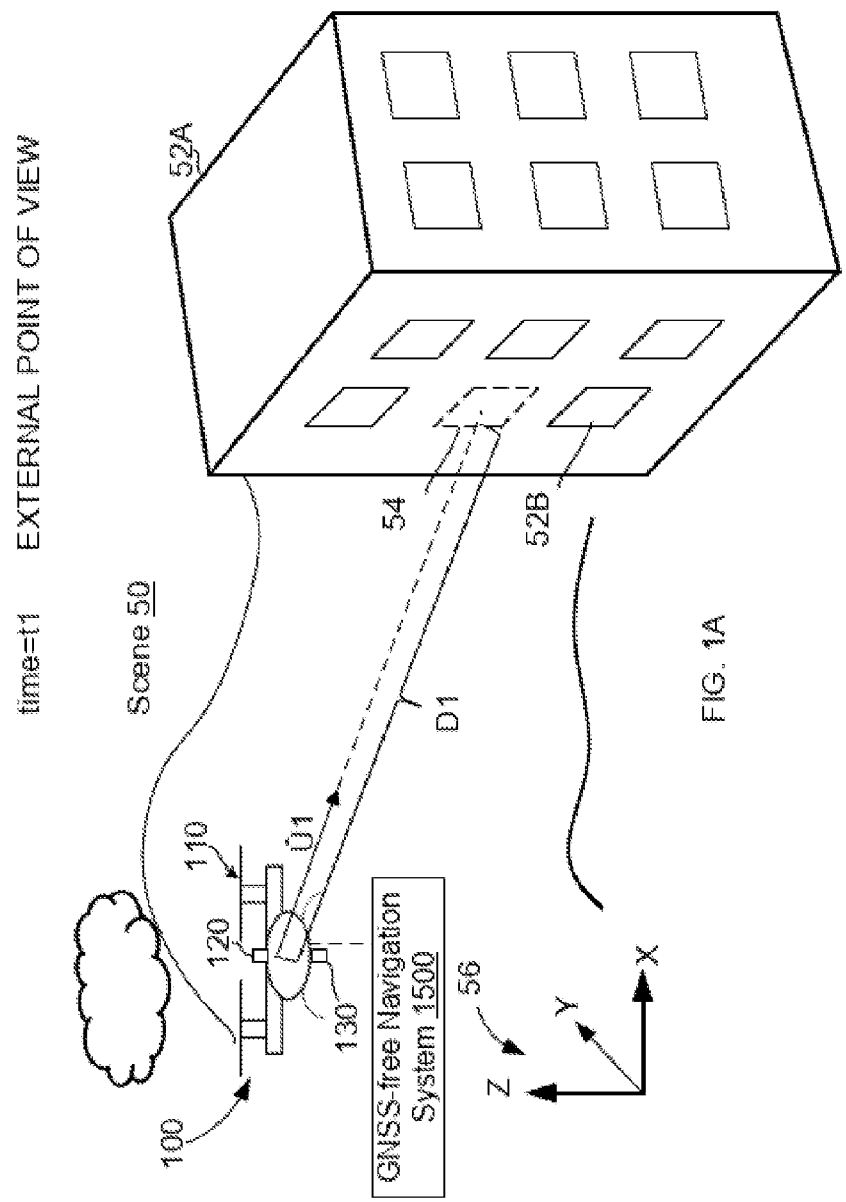
FIG. 1A shows a scene containing an airborne mobile platform and a target, from a point of view (POV) external to the airborne mobile platform at a first point in time, in accordance with some exemplary embodiments of the disclosure.

Currently known techniques for navigating mobile platforms such as manned or unmanned vehicles (UV), and in particular unmanned aerial vehicles (UAV), make intensive usage of Global Navigation Satellite systems (GNSS), such as the US-operated Global Positioning System (GPS), the European-operated "Galileo" System, the Chinese-operated "BeiDou" Navigation Satellite System (BDS), the Russian-operated Global Navigation Satellite System (GLONASS) or others.

One technical problem of the disclosure relates to navigating mobile platforms (e.g., UVs) in situations where GNSS-based navigation is not available (temporarily, or permanently) due to limitations having for instance operational, technological and/or legal characteristics.

For example, in various scenarios and/or situations GNSS-based navigation may not be accurate enough or unavailable due to lack of satellite sightline. In further examples, use of GNSS-based navigation may be undesirable, for example, to prevent GNSS-based mobile platform detection and/or geolocation.

In some examples, GNSS-based navigation may be unavailable, due to non-availability of a GNSS receiver in a UV. A UV's GNSS receiver may be non-available due to receiver deactivation, receiver malfunction or because the UV is not equipped with a GNSS receiver. In some examples, a GNSS signal receiver may be deactivated, or the UV may be free of a GNSS receiver, e.g., to prevent GNSS-based UV detection and/or UV geolocation.

In some examples, GNSS-based navigation may be unavailable due to discontinuation of GNSS signal transmission by GNSS satellites. Discontinuation of GNSS signal transmission may be intentional or unintentional.

In some examples, GNSS-based navigation may be available within a first geographical area during a first time period yet may be unavailable during a second time period, different from the first time period, in the same geographic area. In a further example, GNSS-based navigation may be available for use in a first geographic area but, at the same time, unavailable in a second geographic area.

In military as well as in civil missions employing UVs, (intentional or unintentional) non-availability of GNSS-based navigation service may result in loss of navigational control, which may in turn cause temporary or permanent damage to the UV and jeopardize the mission.

Hence, under certain circumstances, dependency on GNSS-based navigation systems should be reduced or avoided, and alternative navigation manners need to be enabled, instead of or as backup to GNSS-based navigation systems.

One technical solution of the disclosure relates to a GNSS-free navigation system and method for navigating a UV to a target (also: target location, target destination, target object), partially or fully without using GNSS in scenarios where GNSS-base navigation is temporarily or permanently limited or unavailable.

In some embodiments, a UV may be navigated from a point of origin P0 towards a target located in a scene without requiring a Global Navigation Satellite system (GNSS) for autonomously navigating a UV from a starting point towards a target with the use of image data. In some examples, the platform's position estimate may be determined relative to the platform's navigation starting point. With the navigation technique, a position of the mobile platform relative to the target may or may not be determinable. It is noted that the expression "point of origin" may not necessarily pertain to a navigation starting point, but can refer to any position within the scene that may serve as a reference for navigating the platform towards the target according to methods described herein.

The GNSS-free navigation method may include acquiring at a first position of the mobile platform relative to the target, by the imaging device, an image of the scene comprising the target, to produce image data. The image data may then be analyzed to determine a direction vector for advancing the mobile platform, in accordance with the direction vector, towards the target. At a new position of the mobile platform, another image may be acquired for creating new image data to generate, based on the new image data, an additional direction vector for advancing the mobile platform in accordance with the additional direction vector to the target. Furthermore, using a distance sensing device of the mobile platform, it is attempted to sense a distance between mobile platform and the target. This procedure is repeated, creating a plurality of displacement vectors, until the distance sensing device produces an output that is descriptive of a distance estimate between the mobile sensing device of the mobile platform meeting a low-distance criterion, e.g., the distance estimate is below low-distance threshold. Based on the distance estimate, at least two of the plurality of direction vectors are retroactively updated or weighted to create displacement vectors having a magnitude, for determining, based on at least two or all of the displacement vectors, a current position of the mobile platform relative to the target for navigating the mobile platform from the current position to the target by determining a model displacement vector representative of the at least two or all of the displacement vectors. The model displacement vector may be determined, for example, by computing an (e.g., weighted mean), (e.g., weighted) average and/or median value relating to parameter values descriptive of the at least two or all the displacement vectors. The model displacement vector is representative of a flight path traversed by the mobile platform from a starting position to a current position. By determining the model displacement vector, a more accurate position estimate of the platform's current position may be determined, compared to a previously determined current position estimate. It is noted that whether or not the terms "average" and "mean" may be used interchangeably may depend on the particular implementation for computing a model displacement vector. In some examples, time stamps may be associated with a flight path to arrive at a trajectory.

In some examples, a displacement vector may be referred to as a reference displacement vector. Based on at least two reference displacement vectors, a model displacement vector may be determined which is descriptive of a model position of the mobile platform relative to the target. In some examples, starting and end points of a (model) displacement vector may be associated with corresponding time stamps. Hence, a (model) displacement vector may be representative of a model trajectory.

A model or representative displacement vector may be determined to provide a more accurate estimate of a current relative model position of the mobile platform relative to the target, compared to a relative position estimate that is determined based on a single displacement vector.

For example, the plurality of reference displacement vectors may define a centerline coinciding with the model displacement vector. In some other examples, the model displacement vector represents a component-wise (e.g., weighted) average, (e.g., weighted) mean or median, of at least two reference displacement vectors.

Using a model displacement vector, uncontrolled collisions between the UV and the target may be avoided, resulting from comparatively inaccurate estimations of reference displacement vectors due to, for example, gusts of wind, and/or the like, to avoid uncontrolled collisions between the mobile platform and the target.

In some embodiments, the mobile platform may be further advanced in accordance with at least one additional displacement vector(s) which may be determined based on additional distance outputs produced by the distance sensing device, from a current to a subsequent position. In some embodiments, the mobile platform may be advanced towards the target in accordance with at least one additional model displacement vector that is determined based on the at least one additional displacement vector.

In some embodiments, GNSS-free navigation system and methods disclosed herein may be employed to complement additional GNSS-free navigation techniques including, for example, Simultaneous Localization and Mapping (SLAM)-based navigation techniques; triangulation-based navigation techniques where the target transmits a signal; star-based navigation techniques, and/or the like.

The term "platform" may include any kind of, for example, movable or mobile platform such as any kind of vehicular device including, for example, two-wheeled vehicles, any kind of three-wheeled vehicles, four-wheeled vehicles, land-based or terrestrial vehicles including, for instance, a passenger car, a motorcycle, a bicycle, a transport vehicle (e.g., a bus, truck), a watercraft; a robot, a pedestrian wearing gear that incorporates the GNSS-free navigation system; a submarine; a multipurpose vehicle such as a hovercraft and/or the like. The mobile platform may be a fully autonomous vehicle (for example a self-driving car or self-piloting drone) and/or a partially autonomous vehicle, a manned movable platform an unmanned movable platform. In some embodiments, the mobile platform may be an (e.g., fixed wing or rotary wing) manned or unmanned aerial vehicle (UAV). For example, the system may be used by a manned or unmanned aerial vehicle to facilitate navigation of the (e.g., airborne) vehicle between buildings in a dense urban environment and/or to navigate the vehicle into building openings (e.g., windows, doors) and/or towards other targets or destinations.

Figure 1B:
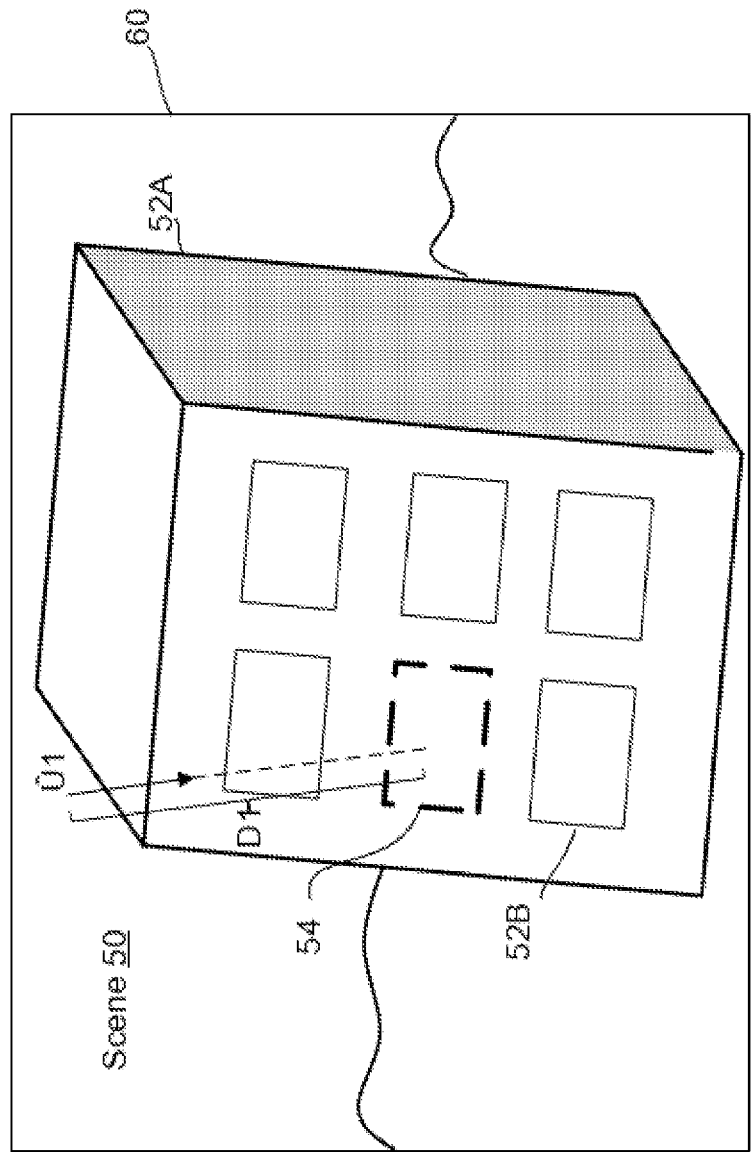
FIG. 1B shows a scene containing an airborne mobile platform and a target, from a point of view (POV) external to the airborne mobile platform at the first point in time, in accordance with some exemplary embodiments of the disclosure.
Figure 2:
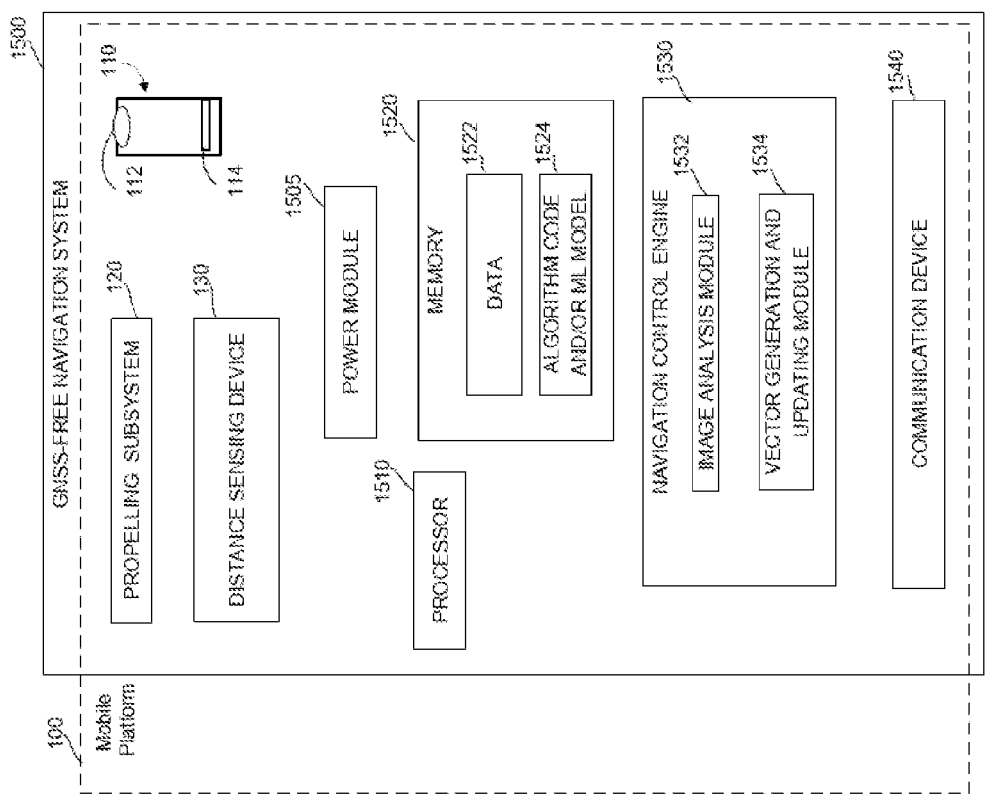
FIG. 2 shows a schematic block diagram of a system for navigating a UV to a target without relying on GNSS services, in accordance with some exemplary embodiments of the disclosure.

Reference is now made to FIGS. 1A, 1B and further to FIG. 2. FIG. 1A schematically shows a scene 50 from an external point of view, at time=t1, when a target 54 is within the field of view of a mobile platform 100 such as a UV, and FIG. 1B shows scene 50 at the same time, but from the point of view of mobile platform 100 as captured by its imaging acquisition optics, schematically represented by image frame 60. FIG. 1A also shows a mobile platform 100 such as a drone, as it approaches an object identified or designated as target 54, such as a specific opening of a building 52A having a plurality of openings 52B.

As schematically shown, mobile platform 100 includes and/or employs a GNSS-free navigation system 1500. Mobile platform 100 may employ GLASS-free navigation system 1500 for navigating mobile platform 100 in a GNSS-free manner, based on image data, from a point of origin towards target 54.

In some embodiments, the image data may be based on image acquisition by an imaging device and/or may for instance be based on Location-tagged visual data descriptive of publicly available scene information (e.g., satellite images and/or maps) fetched from respective internet services (e.g., Google® maps, Google® Earth, Bing® Maps, Leaflet®, Mapquest® or Uebermaps).

In some embodiments, the image data may be descriptive of an image acquired by an imaging device 110 of GNSS-free navigation system 1500.

Some of the subsystems, devices, components, modules, functional engines and/or processes of GNSS-free navigation system 1500 may be run and/or comprised in mobile platform 100 and some may executable and/or comprised in one or more computing platforms external to mobile platform 100.

For example, mobile platform 100 may comprise imaging device 110 that may be mounted on and/or comprised in mobile platform 100. Imaging device 110 may include one or more imagers, image sensors, cameras, such as still camera, a video camera, a thermal camera, a narrow angle camera, a wide angle camera, and/or the like. GNSS-free navigation system 1500 may be configured to analyze images captured by imaging device 110 of mobile platform 100.

External computing platform(s) may be, for example, a cloud computer or any other accessible computing platform capable of performing at least some of the required computations for implementing, fully or partially, GNSS-free navigation according to some embodiments. As outlined herein below in greater detail, GLASS-free navigation system 1500 may comprise one or more communication components, for wired and/or wireless transmission and receiving of signals encoding data such as images, or parts or products thereof, within mobile platform 100 and/or for the wireless transmission to and receiving of signals from one or more external computing platforms.

Mobile platform 100 may further comprise a propelling subsystem 120 that is controlled in accordance with instructions received from one or more processors of GNSS-free navigation system 1500, as outlined herein in further detail.

Mobile platform 100 may additionally include a distance sensing device 130 configured to sense a physical distance-related quantity for deriving or determining a position estimate P of mobile platform 100 relative to coordinate system 56.

In some examples, an object or location in scene 50 may be automatically identified as a target 54 by a target acquisition subsystem (not shown). In some examples, an object or location in scene 50 may be automatically identified as a target 54, for example, based on user-defined constraints. In some examples, an object or location may be designated as a target 54 by a user or operator of mobile platform 100. In some examples, target identification may be performed based on machine learning models to implement artificial intelligence functionalities.

The target acquisition system may use any deterministic, heuristic algorithm or hybrid (e.g., combined deterministic and heuristic) algorithm, including but not limited to an artificial intelligence (AI) engine, such as any type of neural network adapted to locate an object within an image, edge detection, corner detection, and/or the like.

Figure 3A:
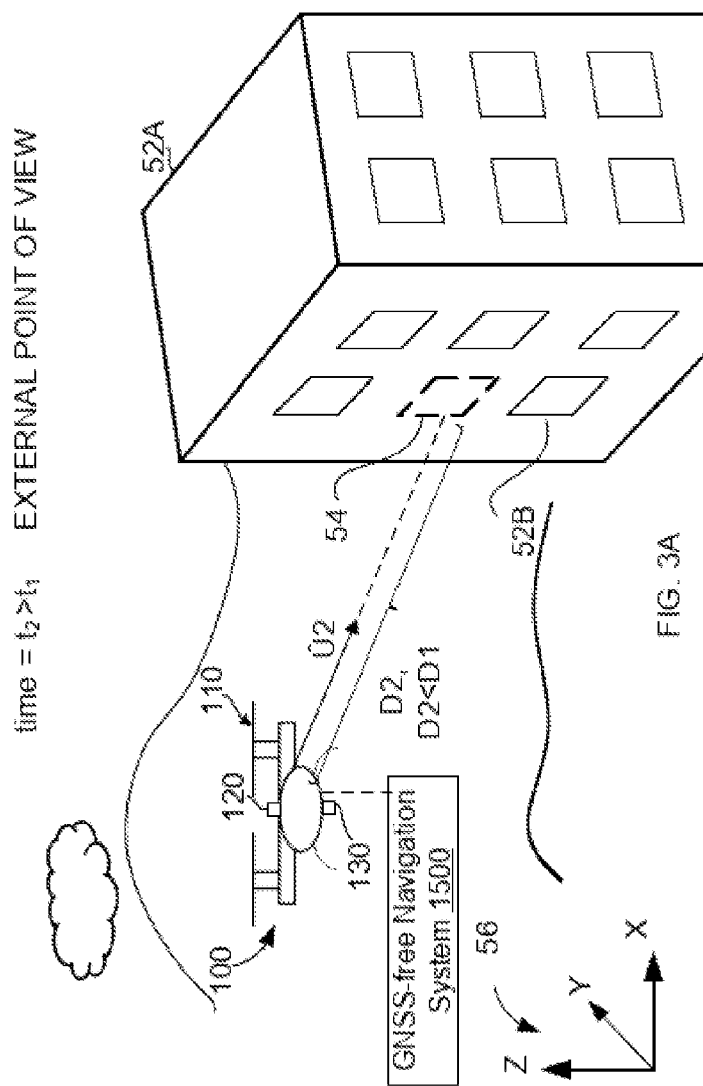
FIG. 3A shows the scene containing the airborne mobile platform and a target, from a point of view external to the UV at a second point in time, in accordance with some exemplary embodiments of the disclosure.

Further reference is made to FIGS. 3A-B. In some embodiments, once an object is identified by the target acquisition system as a target 54, a direction vector Û1 (herein sometimes also referred to as a "unit vector") may be determined by GNSS-free navigation system 1500 pointing from a current position Pcur1 associated with mobile platform 100 towards target 54. For example, unit vector Û1 may point towards a specific point of target 54, such as its geometrical center.

It is noted that although examples disclosed herein may refer to "direction vectors" having a magnitude of "1", embodiments may also be implemented using any arbitrary length for generating a direction vector which can attain a value different from "1". For instance, a direction vector may be assigned a length of comparatively large magnitude to virtually designate pointing from the UV towards infinity.

In some other examples, the direction of unit vector Û1 may be determined based on the acquired image and further based the optical imaging parameters of imaging device 110 such as the field-of-view (FOV).

Mobile platform 100 may then be propelled, guided, or otherwise advanced in direction of first unit vector Û1 towards target 54.

FIGS. 3A-B show a snapshots or scenario at time=t2>t1 after mobile platform 100 was propelled in direction of unit vector Û1 towards target 54. FIG. 3A shows an external point of view and FIG. 3B schematically shows an updated image frame 60', both at time=t2>t1 with respect to FIGS. 1A and 1B.

Thus, mobile platform 100 has advanced towards target 54 and is now at an estimated distance D2 from target 54, which is smaller than D1, and GNSS-free navigation system 1500 determines a second direction vector Û2 pointing from a second current position Pcur2 associated with mobile platform 100 at t=t2 towards target 54. Mobile platform 100 may then be advanced in direction of the second unit vector Û2 towards target 54.

The steps of determining a direction vector Û and advancing mobile platform 100 along the determined direction vector Û towards target 54 may be repeated until a distance D between mobile platform 100 and target 54 can be comparatively accurately determined with a distance sensor of the mobile platform. Until then, GNSS-free navigation system 1500 may determine a plurality of direction vectors $\hat{U}1, \ldots, \hat{U}i, \ldots, \hat{U}n$. The plurality of direction vectors $\hat{U}_N$ may be descriptive and/or relate to a path estimate traversed by mobile platform 100.

Once the distance between mobile platform 100 and target 54 drops below the low-distance threshold, a distance Ds between mobile platform 100 and target 54 may become measurable, for example, by employing a distance sensing device mounted on mobile platform 100.

The low-distance threshold may be equal or lower than, for example, 15 meters, 10 meters, 9 meters, 5 meters, 4 meters, 3 meters or 2 meters. The distance Ds that is measured with the assistance of a distance sensing device may herein be referred to as "sensed distance Ds".

The distance sensing device (also: distance meter, or range meter) may employ a distance or proximity sensor that may rely on a variety of techniques such as ultrasound-based, optical-based (e.g., infrared, laser, LED-based, LIDAR-based, VCSEL-based etc.), and/or a radar-based distance sensing or ranging. In some examples, the distance sensing device may be implemented by or include a stereoscopic camera. As mentioned above, the accuracy of a sensed distance could be significantly adversely affected, for example, by a sudden gust of wind and/or the like, which may lead to uncontrolled collision of mobile platform 100 with objects near target 54 or with the target itself. For instance, when navigating mobile platform 100 towards an opening in a building wall, accurate navigation is required to prevent uncontrolled collision of mobile platform 100 with the wall. This becomes particularly challenging the closer mobile platform 100 is relative to target 54. To prevent or mitigate the risk of uncontrolled collision, mobile platform 100 may be navigated towards in accordance with one or more model displacement vectors. Each model displacement vector may be determined based on at least two reference displacement vectors.

Figure 4B:
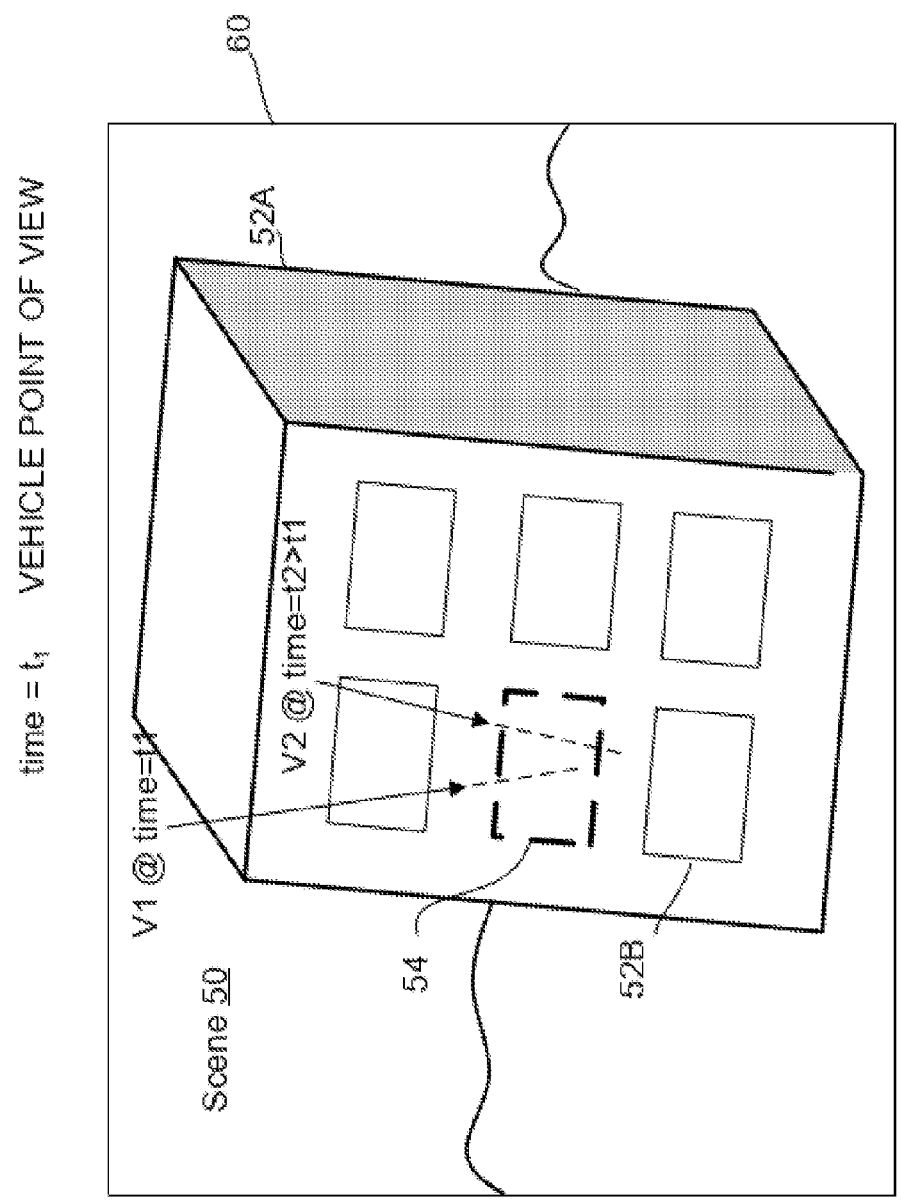

In some examples, based on the determined distance estimate Ds, the lengths of the direction or unit vectors $\hat{U}i$, which were generated when the distance was above the low-distance threshold, may be retroactively updated to arrive at a plurality of displacement vectors schematically illustrated in FIGS. 4A and 4B by vectors V1 and V2 for time stamps t1 and t2, where t2>t1 and which are descriptive of path sections traversed by mobile platform 100 in the past. In some examples, a model displacement vector Vm may then be determined based on at least two or all of the plurality of displacement vectors Vn. In the example shown, the length of vector V1 is larger than the length of vector V2. Clearly, vector magnitudes and directions are examples only and should by no means construed in a limiting manner. A specific distance L of mobile platform 100 from an estimate P to target 54 is herein designated by "Li", herein exemplified in FIG. 4A as "$L_1$" and "$L_2$", wherein $L_2 < L_1$.

It is noted that each displacement vector Vi may represent a direction and magnitude of a path section traversed by mobile platform 100 moving towards target 54, e.g., until the low-distance threshold criterion was met. In some examples, the number of unit vectors $\hat{U}$ may correspond (e.g., be identical) to the number of displacement vectors V.

In some examples, based on the sensed distance Ds, at least some of the plurality of the unit or direction vectors $\hat{U}$ may be retroactively weighted to arrive at the plurality of displacement vectors V, each one not only indicating a direction but also a magnitude indicative of a path section of a total path traversed by mobile platform 100. In other words, the retroactively updated unit vectors V have a definite length and direction, and are designated as displacement vectors V1, . . . , Vn.

In some embodiments, the plurality of displacement vectors V may be descriptive of the path traversed by mobile platform 100 from the point of origin P0 towards target 54.

In some embodiments, as a result of determining the displacement vectors V, a plurality of UV position estimates relating to a path traversed by mobile platform 100 from the point of origin P0 towards target 54 may be derived.

In some examples, the plurality of position estimates P may be descriptive of the UV's positions at the starting and/or end points of the displacement vectors $V_N$ with respect to coordinate system 56 The plurality of displacement vectors Vn may be used to determine a current position estimate Pcur of mobile platform 100 relative to target 54.

It is noted that a multiplicity (e.g., tens, hundreds, thousands, tens of thousands or millions) of iterations may be performed for determining a corresponding number of position estimates P, based on a multiplicity (thousands, tens of thousands or millions) of displacement vectors $V_N$.

Errors may be introduced when determining a displacement vectors $V_I$ and/or a corresponding position estimate P, for example, due to system tolerances (e.g., clock drift) between different processors, computational latencies, and/or environmental factors that could influence a UV's actual current position determination. As mentioned above, such environmental factors can include, for example, wind-related factors such as gust of wind, sudden change in wind direction, etc.

However, since the current position estimate Pcur may be determined based on a multiplicity (e.g., tens, hundreds, or thousands) of displacement vectors $V_N$, the impact or influence of errors that could be introduced when determining the current position estimate Pcur may be mitigated, become (e.g., statistically) insignificant, comparatively negligible and/or may be eliminated altogether.

In some examples, the methods described herein facilitates identification of statistical outliers relating to displacement vectors and/or position estimates. In some examples, the impact of statistical outliers may be mitigated or be comparatively negligible.

Once a plurality of direction displacement vectors V has been determined (after a determined position estimate of mobile platform meets a low-distance criterion), a current position of mobile platform 100 relative to target 54 can be determined, allowing determining prospective displacement vectors V for advancing or navigating the mobile platform from its current position Pcur to target 54 at comparatively increased accuracy. For example, mobile platform 100 may be navigated into opening 54 at reduced risk or no risk of missing opening 54, thus reducing or avoiding the risk of colliding with the wall of building 52A.

In some embodiments, distance sensing may be performed repeatedly to determine, based on correspondingly repeatedly determined distance estimates, prospective displacement vectors V for navigating mobile platform 100 towards target 54.

Examples that may require comparatively increased accuracy of navigating a mobile platform (e.g., autonomously or semi-autonomously) towards a target (or location) can include reconnaissance platforms configured to enter an opening of a building or site for performing a reconnaissance mission, suicide platforms (e.g., suicide drones that attack a target once located), payload delivery platforms (e.g., sensor deployment, explosives deployment, parcel deployment); and/or the like.

As already noted herein, one technical effect of the disclosure is the navigation of a UV to a target, with desired positional accuracy that is comparatively high or increased. The employed systems and methods may thus allow determining, in a GNSS-free manner, a plurality of comparatively platform position estimates (e.g., relative to a world coordinate system, another reference frame, or relative to target 54), optionally along with a corresponding time stamp, allowing navigation of mobile platform 100 towards target 54 at desired or increased accuracy. The increased accuracy may not only be achieved with respect to a longitude and latitude relative to, for example, a world coordinate system 56, but also with respect to (relative and/or absolute) altitude of mobile platform 100. Hence, mobile platform may be accurately navigated towards and through a building opening (e.g., door, window) that is located above ground. It is noted that the disclosure is not limited to building openings but may also relate to any other identifiable target 54.

Another technical effect of the disclosure relates to said accurate navigation being performed without using GNSS systems. This enables the performance of operations, and in particular sensitive or expensive operations without having to rely on the availability of GNSS services. Accordingly, navigation may be invulnerable to the ceasing or non-availability of these services during a mission.

Figure 5:
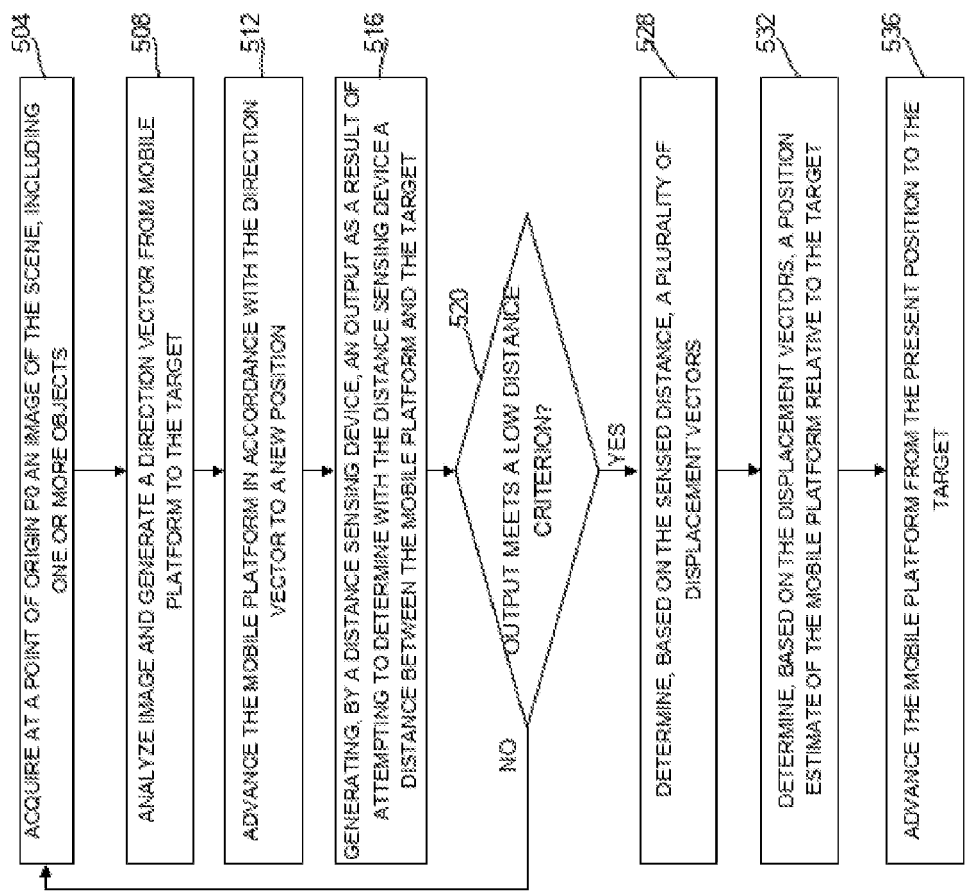
FIG. 5 shows a flowchart of a method for navigating an airborne mobile platform to a target without relying on GNSS services, in accordance with some embodiments of the disclosure.

Additional reference is now made to FIG. 5. In some embodiments, a GNSS-free navigation method may include, acquiring at a point of origin P0 an image of scene 50 including one or more objects (block 504). In some examples, UV may be deployed at the point of origin P0 using GNSS and/or any other navigation means. For example, mobile platform 100 may be transported to position P0 with a truck, carried by a soldier, deployed by an airborne transport vehicle, and/or the like for positioning at point of origin P0. In some embodiments, mobile platform 100 may be piloted to point of origin P0 by a human and/or computerized (e.g., remote) operator using GNSS-based and/or any other navigation (e.g., GNSs-free) navigation techniques. An image of scene 50 may be captured, for example by imaging device 110 of mobile platform 100. The image may be a still image, one or more frames captured by a video camera, a thermal image, and/or the like.

In some embodiments, as indicated by block 508, the method may further include analyzing the captured image to identify which of the objects is a target. Image analysis may employ a variety of target detection or designation techniques that may be based, for example, on heuristics; deterministic techniques; machine learning models including neural networks; and/or the like.

For example, the target may be recognized by comparing a previously obtained image of the target, and searching for the image of the target within the captured image. In other embodiments, for example when the target is an opening from a plurality of openings in a building captured in an image, the target may be specified using a numeric description, such as "the third window from the right of the fourth floor on the east face of the building", in which case an image of the east face of the building may be analyzed to identify the fourth floor and then the third window from the right (or first identify the window column and then the floor). In further embodiments, an operator may designate an object as a target, e.g., by pointing on a selected object.

Once the target is identified or designated, a direction vector $\hat{U}$ pointing towards the target may be determined based on the image captured from a point of view of the UV. In some examples, a direction vector $\hat{U}$ may be based for example on the angle between the sightline of the UV and the plane of the target.

In some embodiments, a drone's flight path may be determined such that the drone approaches for instance a building opening at an angle of about 90 degrees or as close as possible to 90 degrees, e.g., to avoid a sideways approach to prevent crashing of the drone into the frame of the building opening.

As indicated by block 512, the method may further include advancing the mobile platform towards the target. For example, the mobile platform may be propelled, navigated and/or otherwise guided along the direction of the direction vector $\hat{U}$.

As indicated by block 516, the method may further include generating, by a distance sensing device, an output as a result of attempting to determine with the distance sensing device a distance between the mobile platform and the target.

In some embodiments, as indicated by block 520, the method may comprise determining whether the determined estimate Ds meets a low-distance criterion.

In some examples, the low-distance threshold criterion may be set as a (e.g., maximal) distance that can be determined accurately by a distance sensing device, for example within an error not exceeding a predetermined tolerance.

In some examples, the distance sensing device may not return an output or return an output that is not indicative of a distance, as long as the distance between mobile platform 100 and target 54 is exceeds a magnitude that does not allow the distance sensing device to produce a sensed output of a distance. In such scenario, a low-distance criterion may be met when the distance sensing device produces, as a result of (e.g., repeatedly or continuously) attempting to sense a distance between mobile platform 100 and target 54, an output that is descriptive of a sensed distance between mobile platform 100 and target 54. The low-distance criterion may thus, for example, not necessarily be related to a predetermined threshold but may, for instance, solely relate to the sensing constraints of the distance sensing device.

At least one of a variety of techniques may be employed by the distance sensing device including, for example, ultrasound-based, optical-based (e.g., infrared, laser, LED-based, LIDAR-based, VCSEL-based etc.), and/or a radar-based distance sensing or ranging. In some examples, the distance sensing device may be implemented by or include a stereoscopic camera.

When the low-distance criterion is not met, the method may include repeating acquiring a further image (block 504), analyzing the image (block 508) for determining a further direction vector $\hat{U}$ (block 508) to advance the UV in accordance with the direction of the further direction vector (block 512) and re-determining a distance estimate Ds between mobile platform 100 and target 54 (block 516).

As indicated by block 528, the method may further comprise determining, based on the distance estimate Ds, a plurality of displacement vectors V, each having a magnitude and direction. The plurality of displacement vectors may be descriptive and/or relate to a path estimate traversed by mobile platform 100 as expressed by the direction vectors $\hat{U}i$ up until the low-distance criterion is met. In some examples, the plurality of displacement vectors V may be determined based on at least two or all of the plurality of previously determined direction vectors $\hat{U}$, including for example eliminating outlier $\hat{U}i$ vectors. In some examples, a length may be retroactively assigned to least two or all of the plurality of direction or unit vectors generated in repeated iterations (e.g., blocks 508-516), to obtain the plurality of displacement vectors $V_N$, optionally for deriving one or more model displacement vectors Vm.

As indicated by block 532, based on the plurality of displacement vectors $V_N$, a current position estimate Pcur of the UV relative to the target may be determined. The plurality of displacement vectors may be descriptive of the path traversed by mobile platform 100 from the point of origin P0 towards the current position estimate Pcur.

As indicated by block 536, the method may include further advancing the UV from its current position Pcur that meets the low-distance threshold criterion towards the target 54. This may be accomplished, for instance, by constructing additional displacement vectors based on, for example, one or more additional distance sensing which is performed by the distance sensing device and/or additional images acquired by imaging device 110. The additional displacement vectors may be descriptive of a prospective path to be traversed by the UV advancing towards the target 54.

In some embodiments, the FOV of imaging device 110 configured to ensure that the boundaries of a target opening are captured for determining, by GNSS-free navigation system 1500, a geometric center of the target opening to strive navigating the platform from an angle which is (substantially) in direction of the normal of a virtual surface defining the target opening. Thus, the risk that the UV inadvertently crashes into a structure defining the opening may be reduced or eliminated.

Additional reference is now made to FIGS. 6A-C. FIG. 6A schematically illustrates a situation where the platform 100 has traversed a flight path from a starting point A1 (also: point of origin P0) exemplified herein by coordinates (0,0, 0), towards target 54 in accordance with unit vector Û1 exemplified to have a computed end point A2.

It is noted that the coordinates (0,0,0) of point of origin and of any other coordinates mentioned herein are example coordinates only and, therefore, shall by no means be construed in a limiting manner.

The situation is shown in a schematic "birds-eye view", where the X-Y coordinates may pertain to longitude and latitude. It is noted that platform 100 may or may not traverse end point A2, e.g., due to winds, navigation estimation inaccuracies, etc. In a further step, platform 100 may navigate towards target 54 via another (subsequently computed) unit vector Û2. Start point of second unit vector Û2 may or may not coincide with end point of first unit vector Û1, e.g., due to environmental or operational conditions such as for example winds or (e.g., inertial) navigation estimation errors, as already indicated herein. Upon navigating in accordance with second unit vector Û2, platform 100 is shown to have reached a position C1(10,12,17) where a distance D between the platform and the target 54 meets a low-distance criterion. As shown in FIG. 6B, instead of navigating towards targets 54 in accordance with a third unit vector Û3, the system is operable to update (e.g., weight) unit vector Û3 to compute the vector components of displacement vector V3 for navigating the platform to target 54 to arrive at the target.

Displacement vector V3 may be computed based on the sensed distance D between target 54 and platform 100 which may or can for example be assumed to be measured in alignment with the normal N to target 54, and angle θ of the unit vector Û3 relative to the normal to the target 54.

In some examples, direction of a unit or direction vector On relative to a target 54 may for example be determined (also: computed) based on the geometry of the imaging optics of image device 110 employed by platform 100 and, with respect to one or more image frames, the location of the imaged target 54 relative to the scene image in a given frame.

Following computation of displacement vector V3 by weighting Û3, unit vectors Û1 and Û2 may be retroactively updated (e.g., weighted) to arrive at corresponding displacement vectors V2 and V3, all pointing towards target 54, in the same direction as the unit vectors Û1 and Û2, to have corresponding end points A2' (30,35,32) and B2'(29,35,32). The retroactive updating of unit vectors Û1 and Û2 to obtain corresponding displacement vectors V1 and V2 is made possible through the computation of displacement vector V3, which defines the direction and distance of the platforms current position towards the target. As mentioned herein, computation of third displacement vector V3 is facilitated because the distance D between the platform and target can be sensed by a ranging sensor.

It is noted that the numerical values are examples only and should by no means be construed in a limiting manner.

Following retroactive computation of the displacement vectors $V_{1-n}$ (e.g., by retroactively weighting direction vectors $Û_{1-n}$), a model displacement vector may be computed representative of a flight path that was traversed by platform 100 from the point of origin A1 until the distance between platform 100 and target 54 met the low-distance criterion, to arrive at a more accurate current platform position estimate C1', herein exemplified by updated current coordinates (11, 11, 18). It is noted that a plurality of updated current position estimates may be determined past the point where platform 100 meets the low-distance criterion.

The flight path that was traversed by the platform 100 is herein schematically illustrated in FIG. 6C by model displacement vector $V_m$ representing, for example, a mean of the spatial distribution of at least two or all of the displacement vectors. Any suitable method may be employed for computing a model displacement vector Vm. In some examples, the plurality of displacement may be added with each other (i.e., vector addition may be performed) to obtain a mean or average direction and magnitude for the model displacement vector, starting from the point of origin. In some examples, as shown in FIG. 6C, the model displacement vector Vm may be constructed from the original starting point A1=M1. In some other examples, the model displacement vector Vm may have starting point coordinates M1' different from those of A1 (i.e., M1≠A1) (not shown). In some examples, the starting point M1' may itself be the geometric mean between the starting points of two consecutively or sequentially computed displacement vectors, which may be two initial displacement vectors. In some examples, a model displacement vector Vm may be constructed to traverse or cross, e.g., a centroid or geometric center, defined by at least two of the retroactively updated displacement vectors V1-Vn. In some examples, a model displacement vector Vm may be constructed to not traverse or cross, e.g., a centroid or geometric center, defined by at least two of the retroactively updated displacement vectors V1-Vn. In some examples, outliers of displacement vectors may be discarded prior to computing the model displacement vector Vm.

It is noted that the term "flight path" represented by model displacement vector Vm may not necessarily refer to a flight path actually traversed by the platform, but to a "model flight path" which is representative of a "real flight path" traversed by the platform. For example, model displacement vector Vm may represent a "model flight path" of a "real flight path". In some examples, such (computed) model flight path may represent a shortest flight path of the platform from the point of origin to the target. In some examples, starting and end points of a real flight path and/or of a (model) displacement vector may be associated with time stamps. Thus, a real flight trajectory and/or (corresponding) model trajectory may be described.

In some examples, a model displacement vector Vm may be determined (also: computed) based on the displacement vectors V1 and V2 to arrive at the more accurate platform position estimate. In some examples, a model displacement vector Vm may be determined (also: computed), based on the displacement vectors V1-V3, to arrive at the more accurate platform position estimate C1'.

Since a model displacement vector Vm is calculated based on a plurality of displacement vectors $V_{1-N}$, a more accurate updated current position estimate may be derived. That is because the adverse effect of comparatively inaccurate position estimates along the retroactively updated or computed flight path on the computation of the current position estimate of the platform within the scene is reduced or minimized. For example, the adverse influence of an "outlier" position estimate along the already traversed flight path on the computation of a current position estimate, is reduced or minimized, because the influence of the corresponding "outlier" displacement vector is reduced or minimized by taking into account additional displacement vectors. It may also be stated that the adverse influence of an "outlier" displacement vector is reduced or minimized, causing a corresponding reduction or minimization in adverse influence of corresponding position estimates.

Either way, by computing a model displacement vector representative of the flight path that was traversed by the mobile platform by taking into consideration a plurality of displacement vectors, errors of (current) platform position estimation are reduced or minimized.

Reference is now made to FIG. 6C. As already indicated herein, to reduce or eliminate navigation errors, or, otherwise stated, to increase navigation accuracy, mobile platform 100 may be navigated towards target 54 based on a model displacement vector Vm. Model displacement vector Vm may be determined based on a plurality of displacement vectors Vn.

Figure 6D:
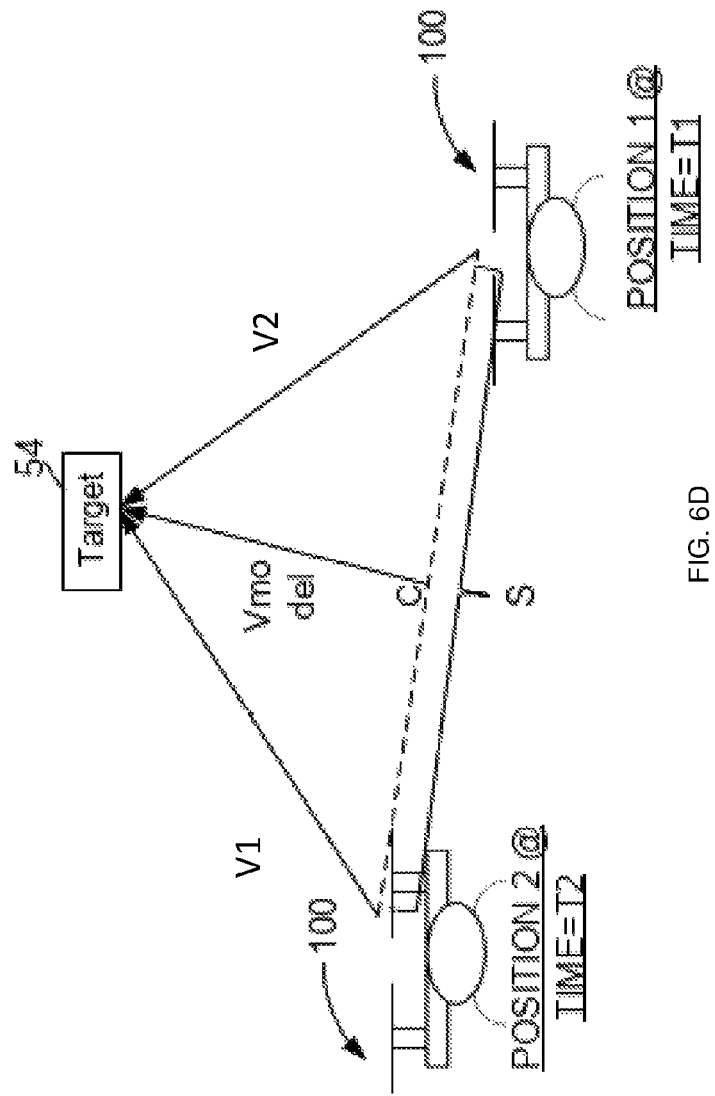

In some embodiments, as exemplified in FIG. 6D, a model displacement vector Vm may be determined (e.g., constructed) by connecting a line S between the starting points of two reference vectors Vref1 and Vref2 to form a triangle T having edges Vref1, Vref2 and S. A geometric center C between the two starting points of Vref1 and Vref2 may then be determined. The geometric center C may define the starting point of the model displacement vector Vm, and target 54 may define the end point of the model displacement vector Vm. Hence, in some embodiments, the model displacement vector Vm passes through the centroid of the triangle T formed by two (e.g., sequential) displacement vectors, and mid-point S defined by the two starting points of the two displacement vectors. It is noted that additional or alternative methods may be used for computing the model displacement vectors, e.g., component-wise summation and weighted mean of each sum for each component by the number of vectors. The starting point for the model displacement vector Vm may be P0.

In some embodiments, "outlier" reference vectors may be discarded and not taken into consideration for computing a model displacement vector. An outlier reference or outliner unit vector may be defined as a vector, which, statistically, does not meet certain an inclusion criterion (e.g., its parameter values deviate outside an inclusion range or that lies outside the overall pattern of a distribution of parameter values of a plurality of displacement vectors or unit vectors, respectively).

Additional reference is now made to FIG. 7. It is noted that the expression "reference vector" and "displacement vector" may herein be used interchangeably. In some embodiments, a GNSS-free navigation method may include, for example, acquiring, at a first position of the mobile platform relative to the target, by the imaging device, an image of the scene comprising the target (block 704).

In some embodiments, the method may further include analyze the image to determine a reference displacement vector Vref pointing from the mobile platform to the target (block 708).

In some embodiments, the method may include acquiring at least one additional image of the scene comprising the target to obtain a plurality of images, wherein the at least one additional image is acquired at a second position different from the first position relative to the target (block 712)

In some embodiments, the method may further include analyzing the at least one additional image to determine at least one corresponding additional displacement reference vector for obtaining a plurality of reference vectors (block 716).

In some embodiments, the method may include determining, based on at least two of the plurality of reference displacement vectors Vref, a model displacement vector Vm descriptive of a model position of the mobile platform relative to the target (block 720).

In a further example, a (e.g., weighted) average, or (e.g., weighted) mean or a median value relating to parameter values of a plurality of reference displacement vectors Vref length and angles may be calculated with and without each particular vector. When a displacement vector significantly differs from a reference value, e.g., median, (e.g., weighted) mean, or weighted average), for example its length or angle differs in more than a predetermined threshold, the corresponding reference vector may be ignored. This scheme may eliminate errors resulting form the image analysis, from sudden gusts of wind, or other factors, and provide for accurately describing the trajectory performed by mobile platform 100.

Assuming, for example, that displacement vectors Vref had been determined based on 100 reference vectors Vref. For each reference vector Vref (excluding the first and last two), a (e.g., weighted) average or (e.g., weighted) mean length and a (e.g., weighted) mean or (e.g., weighted) average angle of the two vectors preceding it and the two vectors following it may for example be calculated as follows to obtain a model displacement vector Vm, wherein l is the length of a vector and θ is its angle:

$$\text{average or mean length } i = \Sigma_{j=-2}^{2} l(\text{Vref}_{i+j})/5, \text{ and}$$
$$\text{average or mean angle } i = \Sigma_{j=-2}^{2} \theta(\text{Vref}_{i+j})/5.$$

In some embodiments, a computed (e.g., weighted) average or (e.g., weighted) mean length and (e.g., weighted) average or (e.g., weighted) mean angle or median (length and/or angle) value may then be compared to the length and angle of Vref. When the difference between the lengths or the angles exceeds, for example, 10%, the respective reference displacement vector Vref may be eliminated. It will be appreciated that the two preceding and two following reference vectors, as well as the 10% difference, are exemplary only and any other numbers may be used.

Reverting to FIG. 2, a schematic block diagram of components of GNSS-free navigation system 1500 is shown and which is configured to navigate a mobile platform such as a mobile platform 100 in accordance with embodiments of the disclosure.

In an embodiment, all devices, components, modules and/or functionalities described with respect to GNSS-free navigation system 1500 may be included and/or implemented onboard mobile platform 100. In an embodiment, some devices, components, modules and/or functionalities described with respect to GNSS-free navigation system 1500 may be included and/or implemented onboard mobile platform 100 and some may be included and/or implemented external to mobile platform 100, for example, by a server (not shown).

In some embodiments, GNSS-free navigation system 1500 may comprise propelling subsystem 120 that is part of mobile platform 100 and configured to propel the mobile platform. Propelling subsystem 120 may for example comprise one or more electrically and/or fossil-based propelling apparatuses (e.g., propulsion-based, rotating wing-based, propeller-based apparatuses); inertial sensors (e.g., gyroscopes, acceleration sensors), non-inertial sensors (e.g., altimeters, pressure sensors); and/or the like.

In some embodiments, GNSS-free navigation system 1500 may further comprise imaging device 110 that includes imaging optics 112 configured to receive and optically guide light received from scene 50 onto an image sensor 114 of camera or imaging device 110 to generate image data descriptive of scene 50 comprising one or more objects.

Imaging device 110 may be implemented as a wide angle camera, a narrow angle camera, a video camera, a thermal camera or the like, configured to capture one or more frames of its surroundings. In some embodiments, mobile platform 100 may comprise two or more imaging devices 110 employing different imaging techniques. For example, a first imaging device may include a wide-FOV camera, and a second imaging device may include a narrow or Tele-FOV camera.

In some embodiments, GNSS-free navigation system 1500 may include a distance sensing device 130 implemented, for example, by an ultrasonic sensor, an infrared sensor, an ultrawideband (UWB) sensor, a laser-based sensor, a RADAR, a LIDAR, a stereoscopic camera and/or the like.

The accuracy of distance sensing device 130 may vary depending on the distance of mobile platform 100 to target 54. In some embodiments, mobile platform 100 may comprise two or more distance sensing device 130, wherein each sensor may be used within a different distance range, when different accuracies are expected, under different weather and/or sight conditions, and/or the like. The number and types of distance sensing device 130 employed by mobile platform 100 may for example depend on the weight and/or shape of each sensor, and/or on the carrying abilities of mobile platform 100.

GNSS-free navigation system 1500 may further include a power module 1505, such as a battery a rechargeable battery, a solar panel, and/or the like, for storing power and providing the power as needed for the various modules and/or components of the system.

GNSS-free navigation system 1500 may further include a processor 1510 and a memory 1520 which is configured to store data 1522 and algorithm code and/or machine learning (ML) model 1524. Processor 1510 may be configured to execute algorithm code and/or apply the ML model 1524 for the processing of data 1522 resulting in the implementation of a navigation control engine or application 1530.

In some examples, processor 1510 may be utilized to perform computations required by mobile platform 100 or any of its subcomponents. Processor 1510 may be configured to execute computer-programs useful in performing, e.g., the systems, methods, processes and/or operations of GNSs-free navigation.

For instance, propelling subsystem 120 of mobile platform 100 may operate in accordance with instructions received from one or more processors 1510 employed for implementing navigation control engine 1530.

Navigation control engine 1530 may be configured to implement (e.g., SLAM-based) navigation techniques for autonomously navigating a UV from a point of origin P0 towards a target while repeatedly attempting to determine or sense, with the use of the image acquired by imaging device 110 and/or other data (e.g., acoustic data), a distance estimate D between the UV's current position and the target.

When an estimated current distance meets the low-distance criterion, navigation data may be complemented with a distance parameter value measured by distance sensing device 130 employed by mobile platform 100 for further navigating the UV to the target 54.

In some embodiments, navigation control engine 1530 may be configured to implement an image analysis module 1532, for analyzing the captured image data. Analysis may include, for example, identifying a target within a captured image, e.g., based on a description of the target comprising for example a graphic and/or textual description. Identifying the target may include image analysis techniques such as edge detection, corner detection, and/or the like. It will be appreciated that image analysis module 1532.

In some embodiments, navigation control engine 1530 may be configured to implement a vector generation and updating module 1534 for repeatedly generating or determining a direction vector $\hat{U}1$ pointing from mobile platform 100 to target 54.

Vector generation and updating module 1534 may also be adapted to determine, based on an obtained or determined distance Ds between mobile platform 100 and target 54, a plurality displacement vectors V having a direction and magnitude. The plurality of retroactively determined displacement vectors may be descriptive of a path traversed by mobile platform 100 up until the distance between the UV and the target meets the low-distance criterion. In some examples, the plurality of displacement vectors may be determined by calculating or associating a magnitude to the direction vectors $\hat{U}$ obtained in the past (i.e., retroactively), for example, up to the point where the low-distance criterion is met. Based on a measured distance, navigation control engine 1530 may be configured to determine at least one current position Pcur of mobile platform 100. The at least one current position Pcur may be determined, for example, by retroactively associating or weighting the unit vectors $\hat{U}$ to arrive at a plurality of displacement vectors V.

In some embodiments, navigation control engine 1530 may be configured to further advance mobile platform 100 towards target 54 by prospectively determining one or more displacement vectors, based on acquired image data and repeated sensing of a distance between mobile platform 100 and target 54, to determine a motion (e.g., flight) path. A plurality of mobile platform position estimates relative to target 54 may be determined with the assistance of the sensing of distances by the distance sensing device employed by the UV. In some examples, the UV position estimates may be associated with a time stamp to determine the UV's trajectory.

It is noted that the term "processor", as used herein, may additionally or alternatively refer to a controller. Processor 1510 may be implemented by diverse types of processor devices and/or processor architectures including, for example, embedded processors, communication processors, graphics processing unit (GPU)-accelerated computing, soft-core processors and/or general purpose processors. In some embodiments, processor 1510 may be implemented as a Central Processing Unit (CPU), a microprocessor, an electronic circuit, an Integrated Circuit (IC), and/or the like.

Memory 1520 may be implemented by diverse types of memories, including transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 1520 may, for example, include, e.g., temporally-based and/or non-temporally based instructions. As long-term memory, memory 1520 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like. Memory 1520 may be a single memory device, or multiple interconnected memory devices which may be co-located on mobile platform 100, or located in various locations such as one or more on mobile platform 100 and one or more on a different platform, accessible to processor 1510 via any communication channel.

GNSS-free navigation system 1500 may comprise communication device 1540 configured to enable wired and/or wireless communication between the various components and/or modules of the system and which may communicate with each other over one or more communication buses (not shown), signal lines (not shown) and/or a network infrastructure.

Communication device 1540 may be operative to receive instructions such as navigation and/or operation instructions from a remote human and/or computerized operator, transmitting images and/or other data to an external system, receiving readings and/or other data from external sources, and/or the like, via the network infrastructure.

The network infrastructure may be configured for using one or more communication formats, protocols and/or technologies such as, for example, to internet communication, optical communication, cellular communication, RF communication, telephony-based communication technologies and/or the like. In some examples, communication device 1540 may include I/O device drivers (not shown) and network interface drivers (not shown) for enabling the transmission and/or reception of data over the network. A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G, 5G, 6G mobile networks, 3GPP, LTE, LTE advanced, Bluetooth® (e.g., Bluetooth smart), ZigBee™, near-field communication (NFC) and/or any other current or future communication network, standard, and/or system.

The components detailed below may be implemented as one or more sets of interrelated computer instructions, executed for example by processor 1510 or by another processor. The components may be arranged as one or more executable files, dynamic libraries, static libraries, methods, functions, services, or the like, programmed in any programming language and under any computing environment.

Aspects of disclosed embodiments pertain to systems, devices and/or methods configured for navigating mobile platforms without utilizing GNSS. Hence, systems, devices and/or methods disclosed herein for navigating a mobile platform may be employed in a GNSS-free, GNSS-denied or GNSS-challenged scenario.

Additional Examples: Example 1 includes a method for navigating a mobile platform using an imaging device on the platform, from a point of origin towards a target located in a scene, and without requiring a Global Navigation Satellite system (GNSS), the method comprising:
  a) acquiring, by the imaging device, an image of the scene comprising the target;
  b) determining, based on analysis of the image, a direction vector pointing from the mobile platform to the target;
  c) advancing the mobile platform in accordance with the direction vector to a new position;
  d) generating, by a distance sensing device, an output as a result of attempting to determine, with the distance sensing device, a distance between the mobile platform and the target;
  repeating a) to d) to advance the mobile platform towards the target, comprising generating a plurality of direction vectors until the output produced by the distance sensing device is descriptive of a distance which meets a low-distance criterion;
  determining, based on the distance meeting the low-distance criterion, a plurality of displacement vectors having a magnitude, and which are descriptive of a path that was traversed by the mobile platform from the point of origin to a current mobile platform position in accordance with the direction vectors; and determining, based on at least one of the plurality of displacement vectors V, a current position estimate of the mobile platform relative to the target. In some examples, the method may include determining a model vector for navigating the platform from its current position to the target. Optionally, the model vector may be determined based on the plurality of displacement vectors.

Example 2 includes the subject matter of Example 1 and, optionally, wherein the platform is navigated towards the target, based on the at least one of the plurality of displacement vectors.

Example 3 includes the subject matter of Example 1 and/or Example 2 and, optionally, determining, based on at least two displacement vectors, a model displacement vector descriptive of a model position of the mobile platform relative to the target for advancing the mobile platform, in accordance with the model displacement vector, towards the target.

Example 4 includes the subject matter of Example 3 and, optionally, wherein the at least two displacement vectors define a centroid; and wherein the model displacement vector has a vector start point coinciding with the centroid and a vector end point coinciding with the target.

Example 5 includes the subject matter of any one or more of the Examples 3 and/or 4 and, optionally, wherein the model displacement vector represents, for example, a component-wise (e.g., weighted) average or (e.g., weighted) mean or median of at least two reference vectors.

Example 6 includes the subject matter of any one or more of the Examples 1 to 5 and, optionally, wherein the target is identified within the image based on a machine learning model.

Example 7 includes the subject matter of any one or more of the Examples 1 to 6 and, optionally, wherein the advancing of the mobile platform in accordance with the direction vectors is performed using one of the following: Simultaneous Localization and Mapping (SLAM) technique; triangulation-based navigation techniques; star-based navigation techniques; or any combination of the aforesaid.

Example 8 includes the subject matter of any one or more of the Examples 1 to 7 and, optionally, wherein the at least one distance sensing devices include one of the following: a stereoscopic camera, an ultrasonic sensor, an infrared sensor, an ultrawideband (UWB) sensor; a laser-based sensor; a RADAR, a LIDAR, or any combination of the aforesaid.

Example 9 includes the subject matter of any one or more of the Examples 1 to 8 and, optionally, wherein the low-distance threshold criterion defines a threshold of equal or lower than 10 meters.

Example 10 includes the subject matter of any one or more of the Examples 1 to 9 and, optionally, wherein the target includes an opening in a building wall.

Example 11 includes the subject matter of Example 10 and, optionally, wherein the opening is a window, a door, and/or a wall breach.

Example 12 includes a system for navigating a mobile platform using imaging from a point of origin towards a target located in a scene, and without requiring a Global Navigation Satellite system (GNSS), the system comprising: a mobile platform comprising an imaging device and a distance sensing device; one or more processors; and one or more memories storing software code portions executable by the one or more processors to cause the system to perform the following steps:
   a) acquiring, by the imaging device, an image of a scene comprising a target;
   b) determining, based on analysis of the image, a direction vector pointing from the mobile platform to the target;
   c) advancing the mobile platform in accordance with the direction vector to a new position;
   d) generating, by a distance sensing device, an output as a result of attempting to determine, with the distance sensing device, a distance between the mobile platform and the target;
   e) repeating a) to d) to advance the mobile platform towards the target, comprising generating a plurality of direction vectors until the output produced by the distance sensing device is descriptive of a distance which meets a low-distance criterion;
   determining, based on the distance meeting the low-distance criterion, a plurality of displacement vectors having a magnitude, and which are descriptive of a path that was traversed by the mobile platform from the point of origin to a current mobile platform position in accordance with the direction vectors; and
   determining, based on at least one of the plurality of displacement vectors V, a current position estimate of the mobile platform relative to the target.

Example 13 includes the subject matter of Example 12 and, optionally, wherein the platform is navigated towards the target, based on the at least one of the plurality of displacement vectors.

Example 14 includes the subject matter of Examples 12 and/or 13 and, optionally, wherein the one or more memories storing software code portions executable by the one or more processors are configured to cause the system to perform the following steps:
   determining, based on at least two displacement vectors, a model displacement vector descriptive of a model position of the mobile platform relative to the target for advancing the mobile platform, in accordance with the model displacement vector, towards the target.

Example 15 includes the subject matter of Example 14 and, optionally, wherein the at least two displacement vectors define a centroid; and
   wherein the model displacement vector has a vector start point coinciding with the centroid and a vector end point coinciding with the target.

Example 16 includes the subject matter of any one or more of the Examples 14 and/or 15 and, optionally, wherein the model displacement vector represents a, for example, a component-wise (e.g., weighted) average or (e.g., weighted) mean or median of at least two reference vectors.

Example 17 includes the subject matter of any one or more of the examples 12 to 16 and, optionally, wherein the target is identified within the image based on a machine learning model.

Example 18 includes the subject matter of any one or more of the Examples 12 to 17 and, optionally, wherein the advancing of the mobile platform in accordance with the direction vectors is performed using one of the following: Simultaneous Localization and Mapping (SLAM) technique; triangulation-based navigation techniques; star-based navigation techniques; or any combination of the aforesaid.

Example 19 includes the subject matter of any one or more of the Examples 12 to 18 and, optionally, wherein the at least one distance sensing devices include one of the following: a stereoscopic camera, an ultrasonic sensor, an infrared sensor, an ultrawideband (UWB) sensor; a laser-based sensor; a RADAR, a LIDAR, or any combination of the aforesaid.

Example 20 includes the subject matter of any one or more of the Examples 12 to 19 and, optionally, wherein the low-distance threshold criterion defines a threshold of equal or lower than 10 meters.

Example 21 includes the subject matter of any one or more of the Examples 12 to 20 and, optionally, wherein the target includes an opening in a building wall.

Example 22 includes the subject matter of Example 21 and, optionally, wherein the opening is a window, a door, and/or a wall breach.

Some embodiments pertain to a mobile platform configured to navigate (fully autonomously or partly autonomously) from a point of origin towards a target located in a scene, without requiring a Global Navigation Satellite system (GLASS), the mobile platform comprising:
   at least one imaging device configured to acquire at least one image of the scene comprising the target;
   at least one distance sensing device configured to produce an output descriptive of a distance between the mobile platform and the target;
   at least one avionics system comprising a navigation control engine for navigating the mobile platform towards the target; in accordance with the following steps:
   a) acquiring, by the at least one imaging device, at least one image of a scene comprising a target;
   b) determining, based on analysis of the at least one image, a direction vector pointing from the mobile platform to the target;

c) advancing the mobile platform in accordance with the direction vector to a new position;
d) generating, by the at least one distance sensing device, an output as a result of attempting to determine, with the distance sensing device, a distance between the mobile platform and the target;
e) repeating a) to d) to advance the mobile platform towards the target, comprising: generating a plurality of direction vectors until the output produced by the distance sensing device is descriptive of a distance which meets a low-distance criterion at a current position, and determining an associated current position estimate;
f) retroactively updating, based on the distance meeting the low-distance criterion, at least two of the plurality of direction vectors to obtain, correspondingly, at least two displacement vectors having a magnitude and which are descriptive of a path that was traversed by the mobile platform from the point of origin to the current mobile platform position in accordance with the direction vectors; and
g) determining, based on the at least two displacement vectors, an updated estimate of a current mobile platform position relative to the target.

In some examples, the mobile platform is further configured to determine, based on at least two displacement vectors, a model displacement vector descriptive of a model position of the mobile platform relative to the target for advancing the mobile platform, in accordance with the model displacement vector, towards the target.

In some examples, the at least two displacement vectors define a centroid; and wherein the model displacement vector has a vector start point coinciding with the centroid and a vector end point coinciding with the target.

In some examples, the model displacement vector represents a weighted average or weighted mean or median of at least two reference vectors, which are optionally component-wise weighted average or weighted mean or median.

In some examples, the target is identified within the image based on a machine learning model.

In some examples, the advancing of the mobile platform in accordance with the direction vectors is performed using one of the following:

Simultaneous Localization and Mapping (SLAM) technique; triangulation-based navigation techniques; star-based navigation techniques; or any combination of the aforesaid.

In some examples, the at least one distance sensing devices include one of the following: a stereoscopic camera, an ultrasonic sensor, an infrared sensor, an ultrawideband (UWB) sensor; a laser-based sensor; a RADAR, a LIDAR, or any combination of the aforesaid.

Embodiments may pertain to a mobile platform configured to navigate from a point of origin towards a target located in a scene, without requiring a Global Navigation Satellite system (GNSS), the mobile platform comprising:
at least one imaging device configured to acquire at least one image of the scene comprising the target;
at least one distance sensing device configured to produce an output descriptive of a distance between the mobile platform and the target;
at least one avionics system comprising a navigation control engine for navigating the mobile platform towards the target; in accordance with the following steps:
a) acquiring, by the at least one imaging device, at least one image of a scene comprising a target;
b) determining, based on analysis of the at least one image, a direction vector pointing from the mobile platform to the target;
c) advancing the mobile platform in accordance with the direction vector to a new position;
d) generating, by the at least one distance sensing device, an output as a result of attempting to determine, with the distance sensing device, a distance between the mobile platform and the target;
e) repeating a) to d) to advance the mobile platform towards the target, comprising: generating a plurality of direction vectors until the output produced by the distance sensing device is descriptive of a distance which meets a low-distance criterion at a current position, and determining an associated current position estimate;
f) retroactively updating, based on the distance meeting the low-distance criterion, at least two of the plurality of direction vectors to obtain, correspondingly, at least two displacement vectors having a magnitude and which are descriptive of a path that was traversed by the mobile platform from the point of origin to the current mobile platform position in accordance with the direction vectors; and
g) navigating, based on the at least two displacement vectors, the mobile platform to the target.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The expression "real-time" as used herein generally refers to the updating of information based on received data, at essentially the same rate as the data are received, for instance, without user-noticeable judder, latency or lag.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "'about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled when the value of a given parameter is above a threshold, then the same condition is considered as not being fulfilled when the value of the given parameter is equal or below the given threshold. Conversely, should a condition be interpreted as being fulfilled when the value of a given parameter is equal or above a threshold, then the same condition is considered as not being fulfilled when the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A, B, C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A, B, C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementations are not to be considered essential features of those embodiments, unless the embodiment, example and/or optional implementation is inoperative without those elements.

It is noted that the terms "in some embodiments", "according to some embodiments", "for example", "e.g.,", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data are received. More specifically, in the context of the present invention "real-time" is intended to mean that the image data are acquired, processed, and transmitted from a sensor at a high enough data rate and at a low enough time delay that when the data are displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A method for navigating a mobile platform using an imaging device on the platform, from a point of origin towards a target located in a scene, and without requiring a Global Navigation Satellite system (GNSS), the method comprising:
    a) acquiring, by the imaging device, an image of the scene comprising the target;
    b) determining, based on analysis of the image, a direction vector pointing from the mobile platform to the target;
    c) advancing the mobile platform in accordance with the direction vector to a new position;
    d) generating, by a distance sensing device, an output as a result of attempting to determine, with the distance sensing device, a distance between the mobile platform and the target;
    e) repeating a) to d) to advance the mobile platform towards the target, comprising generating a plurality of direction vectors until the output produced by the distance sensing device is descriptive of a distance which meets a low-distance criterion at a current position where the distance is below a low-distance threshold having a magnitude which is smaller than a distance from the point of origin to the target;
    f) retroactively updating, based on the distance meeting the low-distance criterion, the plurality of direction vectors to obtain a plurality of displacement vectors having a magnitude and which are descriptive of a path that was traversed by the mobile platform from the point of origin to the current mobile platform position in accordance with the direction vectors; and
    g) navigating, based on the plurality of displacement vectors, the mobile platform position to the target.

2. A mobile platform configured to navigate from a point of origin towards a target located in a scene, without requiring a Global Navigation Satellite system (GNSS), the mobile platform comprising:
    at least one imaging device configured to acquire at least one image of the scene comprising the target;
    at least one distance sensing device configured to produce an output descriptive of a distance between the mobile platform and the target;
    at least one avionics system comprising a navigation control engine for navigating the mobile platform towards the target; in accordance with the following steps:
    a) acquiring, by the at least one imaging device, at least one image of a scene comprising a target;
    b) determining, based on analysis of the at least one image, a direction vector pointing from the mobile platform to the target;
    c) advancing the mobile platform in accordance with the direction vector to a new position;
    d) generating, by the at least one distance sensing device, an output as a result of attempting to determine, with the distance sensing device, a distance between the mobile platform and the target;
    e) repeating a) to d) to advance the mobile platform towards the target, comprising:
    generating a plurality of direction vectors until the output produced by the distance sensing device is descriptive of a distance which meets a low-distance criterion at a current position, where the distance is below a low-distance threshold having a magnitude which is smaller than a distance from the point of origin to the target and having an associated current position estimate;
f) retroactively updating, based on the distance meeting the low-distance criterion, at least two of the plurality of direction vectors to obtain, correspondingly, at least two displacement vectors having a magnitude and which are descriptive of a path that was traversed by the mobile platform from the point of origin to the current mobile platform position in accordance with the direction vectors; and
g) determining, based on the at least two displacement vectors, an updated estimate of a current mobile platform position relative to the target.

3. The method of claim 1, comprising:
determining, based on at least two displacement vectors, a model displacement vector descriptive of a model position of the mobile platform relative to the target for advancing the mobile platform, in accordance with the model displacement vector, towards the target.

4. The mobile platform of claim 2, wherein the target is identified within the image based on a machine learning model.

5. The method of claim 3, wherein the model displacement vector represents a weighted average or weighted mean or median of at least two reference vectors, which are optionally component-wise weighted average or weighted mean or median.

6. The mobile platform of claim 2, wherein the steps further comprise:
determining, based on at least two displacement vectors, a model displacement vector descriptive of a model position of the mobile platform relative to the target for advancing the mobile platform, in accordance with the model displacement vector, towards the target.

7. The mobile platform of claim 6, wherein the model displacement vector represents a weighted average or weighted mean or median of at least two reference vectors.

8. The mobile platform of claim 2, wherein the at least two displacement vectors define a centroid; and
wherein the model displacement vector has a vector start point coinciding with the centroid and a vector end point coinciding with the target.

9. The method of claim 1, wherein the low-distance threshold criterion defines a threshold of equal or lower than 10 meters.

10. The mobile platform of claim 2, wherein the advancing of the mobile platform in accordance with the direction vectors is performed using one of the following:
Simultaneous Localization and Mapping (SLAM) technique; triangulation-based navigation techniques; star-based navigation techniques; or any combination of the aforesaid.

11. The mobile platform of claim 2, wherein the at least one distance sensing devices include one of the following:
a stereoscopic camera, an ultrasonic sensor, an infrared sensor, an ultrawideband (UWB) sensor; a laser-based sensor; a RADAR, a LIDAR, or any combination of the aforesaid.

12. A system for navigating a mobile platform using imaging from a point of origin towards a target located in a scene, and without requiring a Global Navigation Satellite system (GNSS), the system comprising:
a mobile platform comprising an imaging device and a distance sensing device;
one or more processors; and
one or more memories storing software code portions executable by the one or more processors to cause the system to perform the following steps:
a) acquiring, by the imaging device, an image of a scene comprising a target;
b) determining, based on analysis of the image, a direction vector pointing from the mobile platform to the target;
c) advancing the mobile platform in accordance with the direction vector to a new position;
d) generating, by a distance sensing device, an output as a result of attempting to determine, with the distance sensing device, a distance between the mobile platform and the target;
e) repeating a) to d) to advance the mobile platform towards the target, comprising generating a plurality of direction vectors until the output produced by the distance sensing device is descriptive of a distance which meets a low-distance criterion at a current position where the distance is below a low-distance threshold having a magnitude which is smaller than a distance from the point of origin to the target and having an associated current position estimate;
f) retroactively updating, based on the distance meeting the low-distance criterion, the plurality of direction vectors to obtain a plurality of displacement vectors having a magnitude, and which are descriptive of a path that was traversed by the mobile platform from the point of origin to the current mobile platform position in accordance with the direction vectors; and
g) determining, based on the plurality of displacement vectors, an updated estimate of a current mobile platform position relative to the target.

13. The system of claim 12, wherein the platform is navigated towards the target, based on the at least one of the plurality of displacement vectors.

14. The system of claim 12, wherein the one or more memories storing software code portions executable by the one or more processors are configured to cause the system to perform the following steps determining, based on at least two displacement vectors, a model displacement vector descriptive of a model position of the mobile platform relative to the target for advancing the mobile platform, in accordance with the model displacement vector, towards the target.

15. The system of claim 14, wherein the at least two displacement vectors define a centroid; and
wherein the model displacement vector has a vector start point coinciding with the centroid and a vector end point coinciding with the target.

16. The system of claim 14, wherein the model displacement vector represents an average or mean or median value of at least two reference vectors.

17. The system of claim 12, wherein the target is identified within the image based on a machine learning model.

18. The system of claim 12, wherein the advancing of the mobile platform in accordance with the direction vectors is performed using one of the following:
Simultaneous Localization and Mapping (SLAM) technique; triangulation-based navigation techniques; star-based navigation techniques; or any combination of the aforesaid.

19. The system of claim 12, wherein the at least one distance sensing devices include one of the following:

a stereoscopic camera, an ultrasonic sensor, an infrared sensor, an ultrawideband (UWB) sensor; a laser-based sensor; a RADAR, a LIDAR, or any combination of the aforesaid.

20. The system claim 12, wherein the target includes an opening in a building wall.

\* \* \* \* \*